(12) United States Patent
Chrisco et al.

(10) Patent No.: US 7,040,461 B2
(45) Date of Patent: May 9, 2006

(54) WHEEL CHOCK

(75) Inventors: Larry L. Chrisco, Fairland, OK (US); Charlie L. Forbis, Quapaw, OK (US)

(73) Assignee: Blitz U.S.A., Inc., Miami, OK (US)

( * ) Notice: Subject to any disclaimer, the term of this patent is extended or adjusted under 35 U.S.C. 154(b) by 0 days.

(21) Appl. No.: 10/605,556

(22) Filed: Oct. 8, 2003

(65) Prior Publication Data
US 2005/0077121 A1   Apr. 14, 2005

(51) Int. Cl.
*B60T 3/00* (2006.01)
(52) U.S. Cl. ....................... 188/32; D12/217
(58) Field of Classification Search ............. 188/32; D12/217, 180
See application file for complete search history.

(56) References Cited

U.S. PATENT DOCUMENTS

| | | | | |
|---|---|---|---|---|
| 1,228,438 A | * | 6/1917 | Horan et al. ............. | 188/32 |
| 1,893,580 A | * | 1/1933 | Colley ...................... | 188/32 |
| 2,240,512 A | * | 5/1941 | Morgensen, Jr. ........ | 188/32 |
| 2,299,115 A | * | 10/1942 | Staley ...................... | 188/32 |
| 2,475,111 A | * | 7/1949 | Ridland ................... | 188/32 |
| 2,521,539 A | * | 9/1950 | Richardson .............. | 188/32 |
| 2,613,764 A | * | 10/1952 | Worden ................... | 188/32 |
| 2,773,564 A | * | 12/1956 | Garard .................... | 188/32 |
| D180,903 S | * | 9/1957 | Jicha et al. ............ | D12/217 |
| D180,922 S | * | 9/1957 | Ziikumnd ................ | D12/217 |
| D181,031 S | | 9/1957 | Wilson et al. | |
| D182,055 S | * | 2/1958 | Wilson ................... | D12/217 |
| 2,848,070 A | * | 8/1958 | Wilson .................... | 188/32 |
| 2,954,101 A | | 9/1960 | Corson | |
| D191,276 S | * | 9/1961 | Jicha et al. ............ | D12/217 |
| 3,289,794 A | * | 12/1966 | Miles ...................... | 188/32 |
| D210,304 S | | 2/1968 | Davis | |
| 3,444,963 A | * | 5/1969 | Davis ...................... | 188/32 |
| D215,325 S | | 9/1969 | Merlo | |
| 3,664,466 A | * | 5/1972 | Rotheiser ................ | 188/32 |
| D229,330 S | | 11/1973 | Miles | |

(Continued)

*Primary Examiner*—Robert A. Siconolfi
(74) *Attorney, Agent, or Firm*—Hovey Williams LLP

(57) ABSTRACT

A wheel chock (10) configured for placement under a resting rubber tired wheel (W), such as a wheel found on a powered vehicle, to maintain the wheel (W) at rest is disclosed. The wheel chock (10) broadly includes a body (12) that defines an internal chamber (14) in communication with an open face (16) presented by the body (12). The body (12) presents a prism-like configuration having a generally triangular shape and includes a pair of oppositely spaced sidewalls (18, 20), a rear wall (22) extending between and adjoining the sidewalls (18,20), and a wheel-supporting surface (24) extending between and thereby enclosing the walls (18,20, 22). The wheel-supporting surface (24) presents a low profile, arcuate leading tire-engaging edge (34). The arcuate leading edge (34) substantially complements the contour of the tire and enables the chock (10) to be easily placed under the wheel (W) in an optimal operating position i.e., in close adjacent alignment with the wheel (W) so that at least a portion of the majority of the circumferentially extending treads of the rubber tire of the wheel (W) engage at least a portion of the chock (10) with a minimal exertion of force and effort by the user. The internal chamber (14) in communication with the open face (16) enables the body (12) of the chock (10) to be stackably nested within another similarly configured wheel chock to provide a compact, space-efficient storage of the chocks that facilitates ready portability for transportation of a pair or more of the chocks in the vehicle.

13 Claims, 3 Drawing Sheets

U.S. PATENT DOCUMENTS

| | | | |
|---|---|---|---|
| 3,800,917 A * | 4/1974 | Vick | 188/32 |
| 3,819,138 A * | 6/1974 | Rehkopf et al. | 248/146 |
| D236,612 S | 9/1975 | Wetzel et al. | |
| 3,937,263 A | 2/1976 | Hill et al. | |
| 4,034,961 A * | 7/1977 | Breen | 254/94 |
| 4,476,961 A * | 10/1984 | Luigi | 188/32 |
| 4,502,816 A | 3/1985 | Creter, Jr. et al. | 405/30 |
| D282,459 S | 2/1986 | Sauber | |
| D298,823 S | 12/1988 | Zutler | |
| 4,797,024 A | 1/1989 | Forrer | |
| 4,842,460 A * | 6/1989 | Schlesch | 410/121 |
| 4,917,219 A * | 4/1990 | Henry | 188/32 |
| D307,575 S | 5/1990 | Gano | |
| D316,243 S * | 4/1991 | Henry | D12/217 |
| 5,046,587 A | 9/1991 | Jones | |
| D321,498 S | 11/1991 | Jones | |
| D326,254 S * | 5/1992 | Ziaylek, Jr. et al. | D12/217 |
| 5,332,066 A | 7/1994 | Pickeral | |
| 5,383,639 A | 1/1995 | Byard | |
| 5,427,339 A * | 6/1995 | Pauli et al. | 248/75 |
| D365,078 S | 12/1995 | Ziaylek | |
| 5,687,516 A * | 11/1997 | Sheehan et al. | 52/174 |
| D387,323 S | 12/1997 | Wilcox | |
| D409,554 S | 5/1999 | Henry | |
| D432,976 S | 10/2000 | Chiang | |
| D448,338 S | 9/2001 | Duvall | |
| D474,729 S | 5/2003 | Sargent | |
| D489,310 S | 5/2004 | Olson et al. | |
| D493,408 S | 7/2004 | Chrisco et al. | |
| D500,979 S | 1/2005 | Chrisco et al. | |
| D502,139 S | 2/2005 | Chrisco et al. | |
| 6,874,745 B1 | 4/2005 | Bean | |

* cited by examiner

WHEEL CHOCK

BACKGROUND OF INVENTION

1. Field of the Invention

The present invention relates generally to wheel chocks. More specifically, the present invention concerns an improved wheel chock presenting a unique configuration that enables easier and more effective use and more efficient storage while allowing the chocks to be manufactured in a more cost-efficient manner from light-weight, durable materials.

2. Discussion of Prior Art

Conventional wheel chocks are known in the art and generally include an external device, typically presenting a triangular configuration, that is positioned in contact with a rubber tired wheel at rest, to maintain the wheel at rest within the design limitations of the chock. It is known in the art to utilize one or more wheel chocks (e.g., placed under one or both sides of one or more wheels) to prevent undesired movement of a resting vehicle, such as a fire fighting vehicle, dump truck, wrecker, recreational vehicle, etc., or other wheeled device, such as a camper, utility trailer, semi-trailer, etc. It will be appreciated that these wheel chocks can be used while the vehicle is in storage, but are typically used while the vehicle is onsite during operation, such as fighting a fire, loading or unloading, camping, etc. In this regard, one or more wheel chocks are typically transported with the vehicle for onsite use. Additionally, in many applications, it is desirable to be able to position the wheel chock(s) in a timely manner in order to minimize, sometimes critical, time spent placing the chock. However, it is also desirable to be able to position the wheel chock(s) in a secure manner so that the vehicle maintains its operating position without the need for repeated adjustment and repositioning.

Prior art wheel chocks are problematic and subject to several undesirable limitations. For example, with all prior art wheel chocks, in order to position the chock in contact with the majority of the treads of the rubber tired wheel at rest, the chock must be physically forced under the wheel to some degree thereby slightly deforming the tire and/or the chock in order to get a sufficiently secure engagement between the tire treads and the chock to desirably prevent the vehicle from any settling movement. The required physical force is typically accomplished by kicking the chock under the wheel. Such physical force is undesirably time consuming, tiresome, and in some cases dangerous. Alternatively, the prior art chocks can simply be placed under the wheel, without forcing them into a secure engagement with the majority of the tire treads, however, this is highly undesirable in most applications as the heavy vehicle is then subject to movement before the majority of treads engage the chock to thereby prevent such movement. Such settling movement can is some cases cooperate with the weight of the vehicle to cause the chock to catastrophically fail or become dislodged, potentially enabling the vehicle to roll uncontrollably. This is particularly problematic on inclined surface applications.

Although larger wheel chocks constructed of heavier, stronger materials can reduce the risks of chock failure, such configurations compound the problems associated with forcing the chock under the tire detailed above. Additionally, users are increasingly desiring compact chocks that can be more easily transported on the vehicle and/or stored when not in use. All prior art wheel chocks, including relatively smaller, compact chocks, are undesirably difficult to transport and/or store particularly when used in a pair, or plurality of chocks, as is typically desired. For example, the solid surfaced, closed body configurations are space consuming and the generally triangular shape, as is preferred, is not conducive to interengaging a pair of chocks for transport and/or storage. In order to maintain chocks paired up, such as to prevent loss of one, some prior art chocks are interconnected with a chain or the like that also serves as a handle to facilitate dislodging the chocks from under the wheel during removal. However, such interconnection does not enable the chocks to be used independently from one another, for example, on separate wheels. Accordingly, there is a need for an improved wheel chock that enables quicker and easier use, while providing more efficient transport and storage, without compromising effective and dependable performance.

SUMMARY OF INVENTION

The present invention provides an improved wheel chock that does not suffer from the problems and limitations of the prior art wheel chocks detailed above. The improved wheel chock enables easier and more effective use and more efficient storage while allowing the chocks to be manufactured in a more cost-efficient manner from light-weight, durable materials without compromising effective and dependable performance. In a preferred embodiment, the improved wheel chock presents an arcuate leading edge that better complements the contour of the chocked wheel to enable a secure chocking engagement to be achieved with minimal force exerted by the user. Additionally, in the preferred embodiment, each wheel chock can be substantially nested within another like wheel chock for easy storage and transport.

A first aspect of the present invention concerns a wheel chock for preventing rotation of a wheel wherein the wheel includes a rim and a tire supported on the rim. The chock broadly includes a body adapted to be placed under the wheel to generally prevent the wheel from rotating in the direction of the body. The body includes a pair of spaced sidewalls and a rear wall extending between the sidewalls. The body presents a leading edge adapted to engage the tire when the body is placed under the wheel. The leading edge is oppositely spaced from the rear wall and extending between the sidewalls. The leading edge is arcuate so as to define a mid-section that is recessed relative to the sidewalls.

A second aspect of the present invention concerns a pair of wheel chocks for preventing rotation of a wheel. Each of the chocks broadly includes a body adapted to be placed under the wheel to generally prevent the wheel from rotating in the direction of the body. The body includes a pair of spaced sidewalls, a back wall extending between the sidewalls, and a wheel-engaging surface extending between the side and back walls. The wheel-engaging surface defines a surface area. The body defines an interior chamber between the walls and surface and an open face communicating with the chamber. The open face defines a face area. The face area is greater than the surface area so that the wheel-engaging surface of one of the chocks can be received through the open face and at least partially within the interior chamber of the other chock.

A third aspect of the present invention concerns a method of preventing rotation of wheel wherein the wheel includes a rim and a tire supported on the rim. The method broadly includes the steps of forming an arcuate leading edge along a first wheel chock, positioning the first wheel chock in an engagement position wherein the leading edge is generally transverse relative to the tire, and sliding the first wheel chock under the wheel while in the engagement position so that the leading edge presents the first point on the first wheel chock that engages the tire.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION

Figure 1:
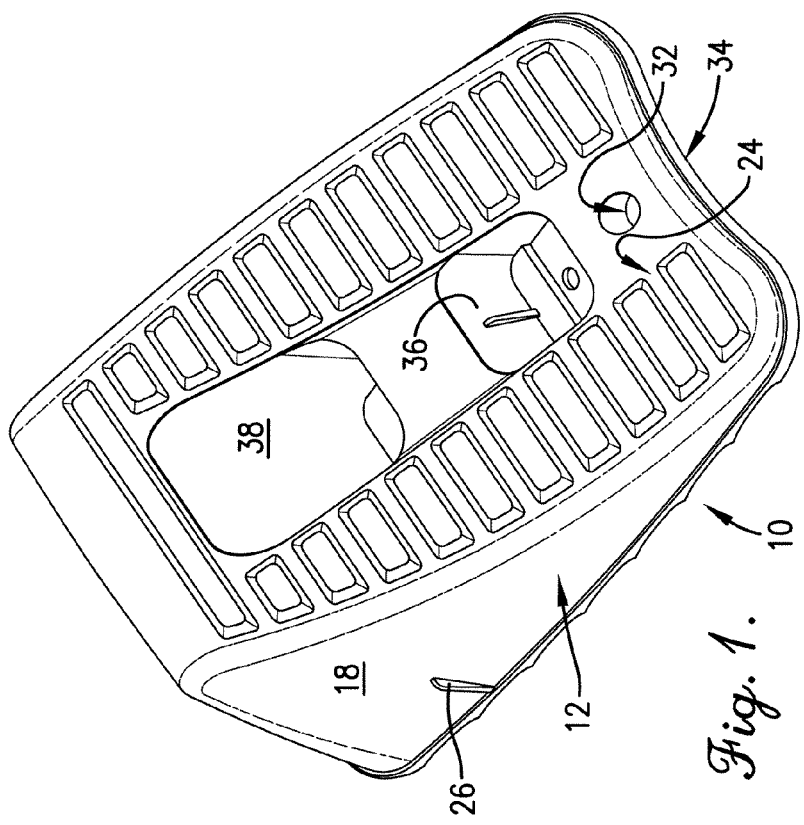
FIG. 1 is a perspective view of a wheel chock constructed in accordance with the principles of a preferred embodiment of the present invention.

FIG. 1 illustrates a wheel chock 10 constructed in accordance with the principles of a preferred embodiment of the present invention and configured for placement under a resting wheel W (see FIGS. 4 and 6) to maintain the wheel W at rest. While the wheel chock 10 is illustrated in use with a rubber tired wheel W, such as a wheel found on a powered vehicle, the principles of the present invention are not limited to use with any particular type of wheel and are equally applicable to prevent undesired movement of virtually any wheel rimmed, tired, or otherwise as well as any wheel-like structure. Additionally, while the improved wheel chock of the present invention is particularly well suited for transporting in a utility vehicle, such as a fire fighting vehicle, dump truck, wrecker, or recreational vehicle, for onsite use to prevent undesired movement of the resting vehicle during operation, such as fighting a fire, loading or unloading, or camping, the principles of the present invention are not limited to any specific use or to any specific vehicle. For example, the inventive wheel chock could be used alone or in combination, placed under one or both sides of one or more wheels when the vehicle is onsite or in storage and is not limited to use with powered vehicles or any particular type thereof and equally apply to virtually any wheeled device, such as a camper, utility trailer, semi-trailer, etc. The illustrated wheel chock 10 broadly includes a body 12 that defines an internal chamber 14 in communication with an open face 16 presented by the body 12 (see FIGS. 1, 5, and 7).

Figure 4:
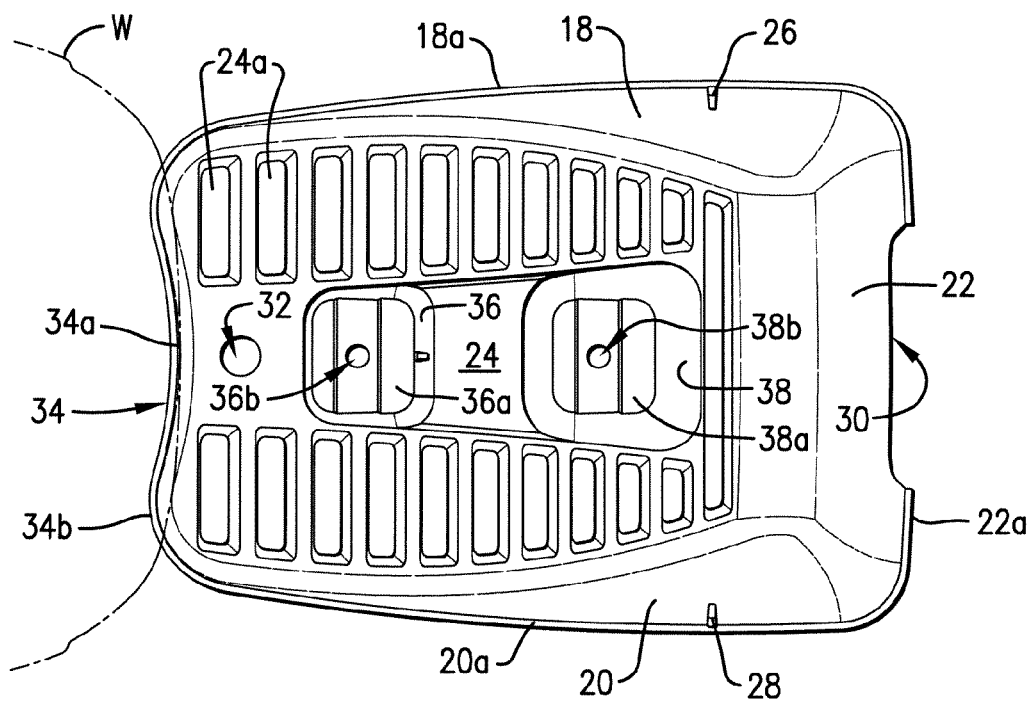
FIG. 4 is a plan view of the wheel chock illustrated in FIGS. 1–3 shown with a rubber tired wheel (in phantom) engaging the complemental arcuate leading edge.
Figure 5:
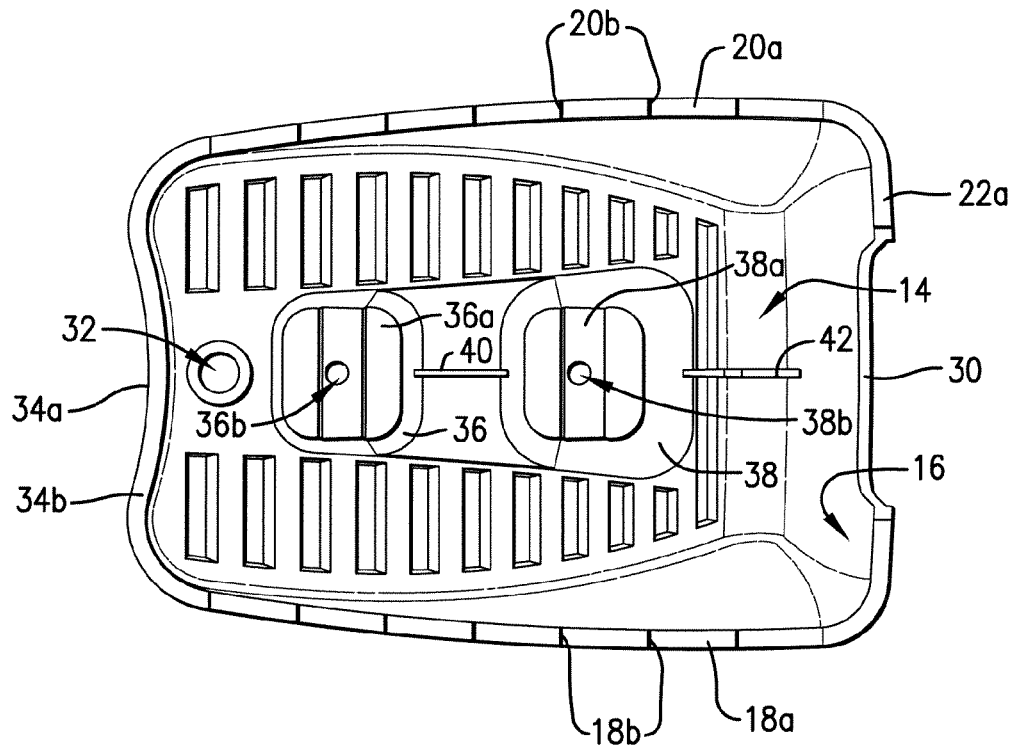
FIG. 5 is a bottom view of the wheel chock illustrated in FIGS. 1–4 showing the support legs projecting through the internal chamber with spacing ribs disposed therein.
Figure 6:
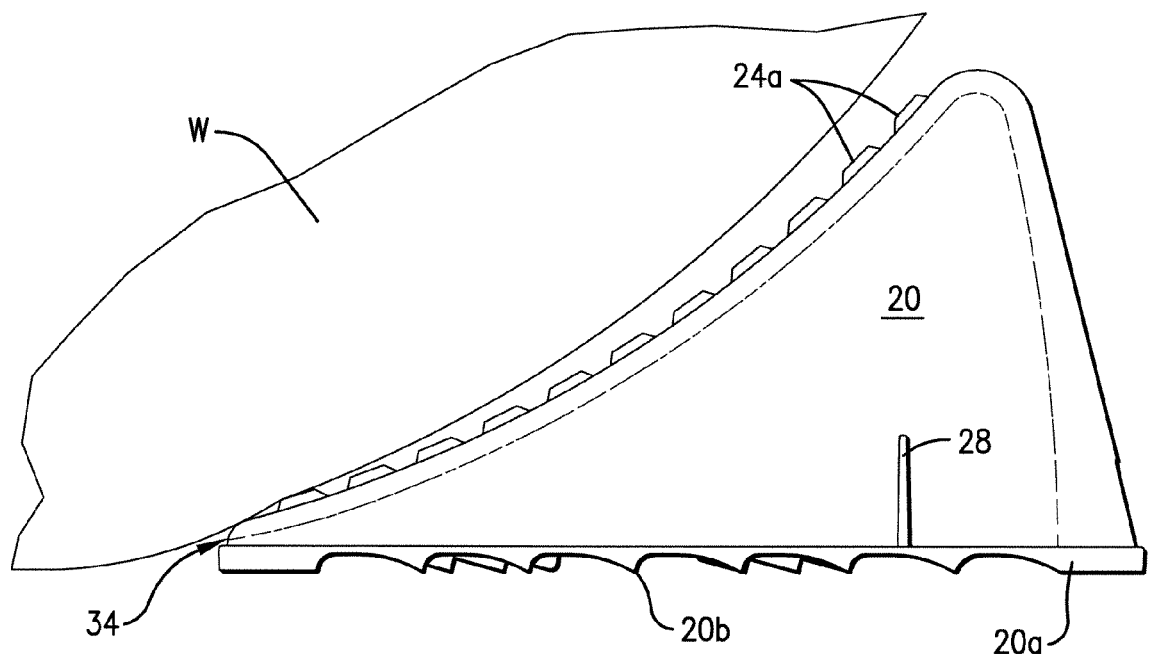
FIG. 6 is a side elevational view of the wheel chock illustrated in FIGS. 1–5 shown with the rubber tired wheel (in fragmentary) engaging the wheel-engaging surface.

Turning now to FIGS. 1–6, the body 12 presents a prism-like configuration having a generally triangular shape and includes a pair of oppositely spaced sidewalls 18 and 20, a rear wall 22 extending between and adjoining the sidewalls 18,20, and a wheel-supporting surface 24 extending between and thereby enclosing the walls 18,20,22. In more detail, the sidewalls 18,20 are mirror images of one another and each present a generally triangular configuration. The sidewalls 18,20 are configured to extend vertically from the ground to the wheel-supporting surface 24 to thereby at least in part support the surface 24 above the ground. In this regard, the sidewalls 18,20 each present a maximum height dimension in the vertical plane adjacent the back wall 22 and a maximum length dimension in the horizontal plane adjacent the ground. In the illustrated body 12, the maximum height dimension is less than the maximum length dimension. In this regard, each of the illustrated sidewalls 18,20 presents a generally arcuate major margin extending along the supporting surface 24 that is configured to generally complement a section, or arc, of the circumference of the wheel W as shown in FIG. 6. However, the major margin need not be arcuate in configuration. Although the sidewalls could be variously sized and configured to present a wide range of heights and lengths, as well as various height-to-length ratios, the sidewalls 18,20 are preferably configured to present a ramp, or chock angle opposite the rear wall 22 of between about thirty-five degrees and not greater than about forty-five degrees. Additionally, and for purposes that will be further detailed below, the sidewalls 18,20 angle at least slightly from ground-to-tip along their junction with the rear wall 22 so that the rear wall 22 is at least slightly tilted relative to vertical.

Figure 7:
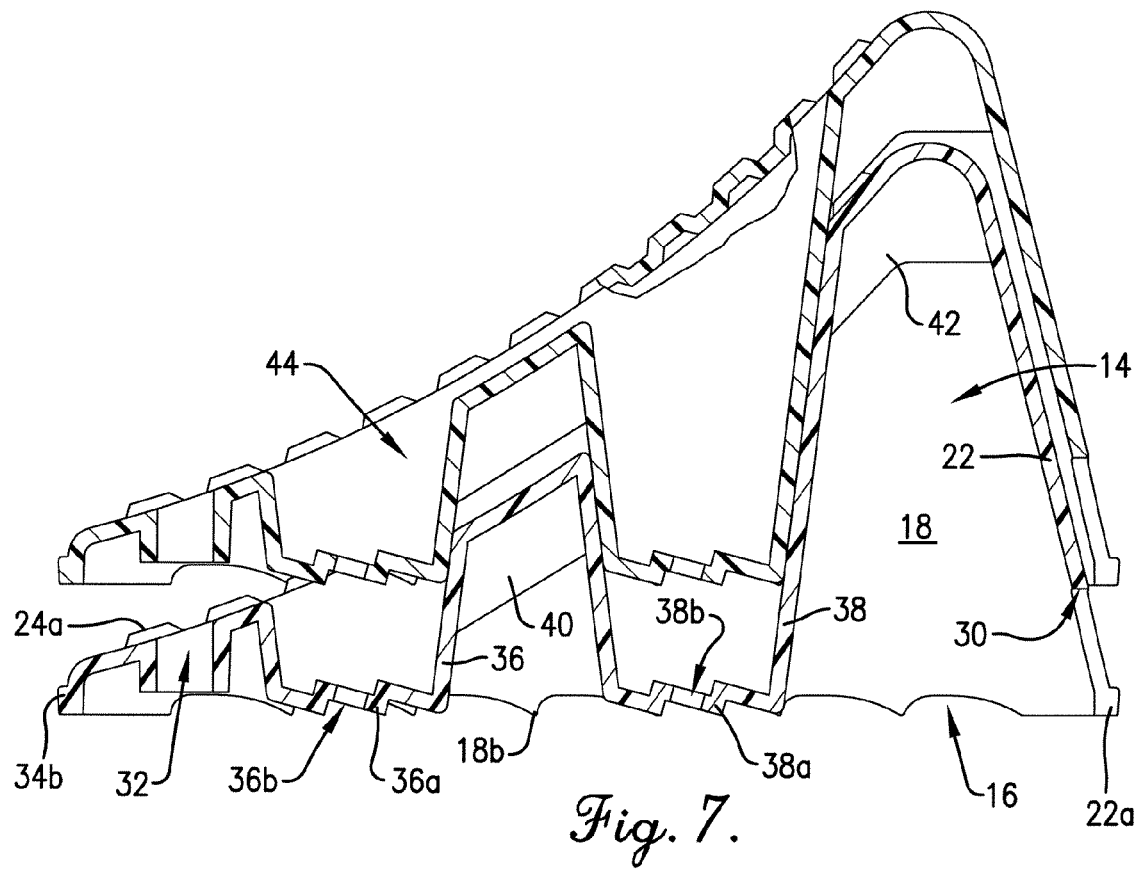
FIG. 7 is a longitudinal sectional view of the wheel chock illustrated in FIGS. 1–6 shown nested inside of another similarly configured wheel chock (shown in section).

Each of the sidewalls 18,20 include an anti-skid rim 18a and 20a, respectively, extending along its lower-most, ground-engaging margin as shown in FIGS. 1, and 5–7. For purposes that will subsequently be described, the rims 18a,20a are thicker, or embossed relative to, the otherwise generally flat sidewalls 18,20. The illustrated anti-skid rims 18a,20a each include a plurality of ground-engaging barbs 18b and 20b, respectively, as shown in FIGS. 5, 6, and 7. The barbs 18b,20b angle away from the major margin of the corresponding sidewalls 18,20. In this manner, the chock 10 can be easily slid in a forward direction towards the wheel W (e.g., right-to-left as viewed in FIG. 6), but is generally prevented from sliding in a backward direction away from the wheel W (e.g., left-to-right as viewed in FIG. 6). For purposes that will subsequently be described, each of the sidewalls 18,20 further include sidewall spacing ribs 26 and 28, respectively. Each of the ribs 26,28 project at least partially out of the corresponding sidewall 18,20 and in the illustrated chock 10, the ribs 26,28 project generally transversely thereto.

Figure 2:
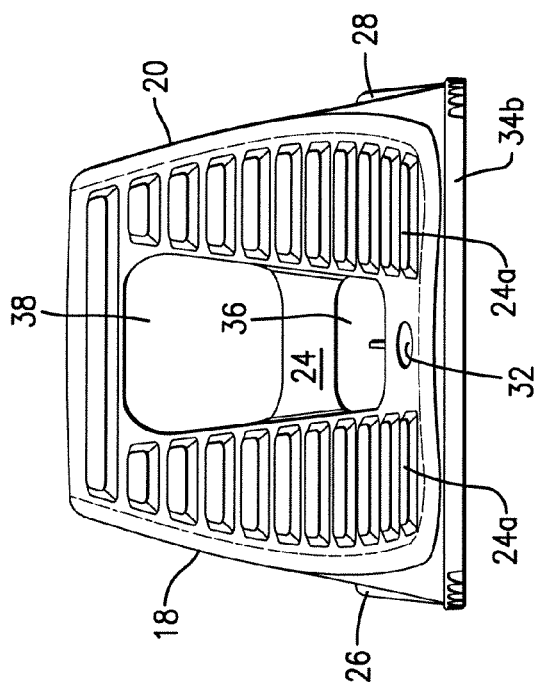
FIG. 2 is a front elevational view of the wheel chock illustrated in FIG. 1.
Figure 3:
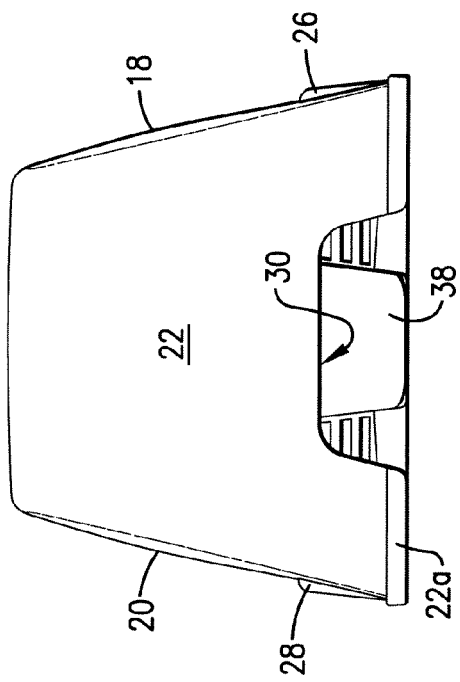
FIG. 3 is a rear elevational view of the wheel chock illustrated in FIGS. 1–2 showing the handle formed in the back wall.

As previously indicated, the rear wall 22 extends between and adjoins the sidewalls 18,20 adjacent the maximum height dimension defined by the sidewalls 18,20. In more detail, and as shown in FIG. 3, for purposes that will subsequently be described, the illustrated back wall 22 presents a generally trapezoidal configuration that defines a major dimension along its lower-most ground engaging margin and a minor dimension adjacent its engagement with the wheel-supporting surface 24. In this manner, the sidewalls 18,20 angle at least slightly inward toward each other from ground-to-tip. The back wall 22 at least in part supports the wheel-supporting surface 24 above the ground. Similar to the previously described sidewalls 18,20, the rear wall 22 also includes an enlarged ground-engaging rim section 22a embossed relative to the otherwise generally flat back wall 22. Formed in the lower portion of the rear wall 22 is a handle 30. The illustrated handle 30 is an opening integrally formed in the wall 22 that communicates with the internal chamber 14. The handle 30 is configured to allow the user to grip the wheel chock 10 and thereby pull the chock 10 out from under the wheel W when the user desires to remove the wheel chock 10.

As previously indicated, the wheel-supporting surface 24 extends between and thereby encloses the sidewalls 18,20 and the back wall 22. Particularly, when the wheel chock 10 is positioned under the wheel W, the wheel-supporting surface 24 is configured to engage the tire of the wheel W to thereby prevent rotation of the wheel W in the direction toward the wheel chock 10 (see FIG. 6). In more detail, the wheel-supporting surface 24 is generally arcuate matching the generally arcuate major margin of each of the sidewalls 18,20. In this manner, just as with the major margin of the sidewalls 18,20 detailed above, the wheel-supporting surface 24 is configured to generally complement a section, or arc, of the circumference of the wheel W as shown in FIG. 6. The illustrated wheel-supporting surface 24 is a non-solid, non-uniform surface. In this regard, the surface 24 includes a plurality of raised wheel-engaging ribs 24a projecting around the periphery of the surface 24. The ribs 24a are configured to engage the rubber tired wheel W to prevent the wheel W from further rotation when the wheel chock 10 is positioned under the wheel W as shown in FIG. 6. For purposes that will subsequently be described, the raised wheel-engaging ribs 24a also serve to strengthen the overall integrity of the wheel-supporting surface 24. The illustrated body 12 includes a hanging aperture 32 formed through the surface 24 between the ribs 24a and adjacent the front end of the chock 10 that is embossed on the back side of the surface 24 for reinforcement (see FIGS. 1 and 5). The hanging aperture 32 is configured to receive a hook (not shown) or some other type of receiver, such as a nail or the like, to secure the wheel chock during storage (e.g., hanging on a wall, etc.). Additionally, as further detailed below, the aperture 32 can also be used to secure the wheel chock 10 to the ground during use.

The wheel chock 10 is uniquely configured to enable the chock 10 to be easily placed under the wheel W in an optimal operating position i.e., in close adjacent alignment with the wheel W so that at least a portion of the majority of the circumferentially extending treads of the rubber tire of the wheel W engage at least a portion of the chock 10 with a minimal exertion of force and effort by the user. In this regard, the wheel-supporting surface 24 presents a low profile, arcuate leading tire-engaging edge 34. In more detail, and as shown in FIGS. 1 and 4–6, the surface 24 slopes away from the back wall 22 and terminates into the leading edge 34 at the ground opposite the back wall 22. The leading edge 34 is arcuately configured so as to substantially complement the contour of the tire of the wheel W when the wheel chock 10 is placed in the operating, or engagement, position as shown in FIGS. 4 and 6 wherein the leading edge 34 is generally transverse relative to the tire of the wheel W (as shown in FIG. 4) and in an engaging relationship therewith (as shown in FIG. 6). It will be appreciated that when the wheel chock 10 is slid under the wheel W into the operating position, the leading edge 34 presents the first point of contact on the wheel chock 10 that engages the tire of the wheel W as shown in FIG. 6.

It will be appreciated that most conventional tires present a generally curved contour. Accordingly, unlike all prior art wheel chocks, the inventive wheel chock 10 with the arcuate leading edge 34 can be slid under the wheel W into the engaging relationship without the need to force the chock 10 under the tire, for example, by kicking and the like. That is to say, the straight, linear leading edges of the prior art chocks engage the crown of the tire along a single tread and therefore must be physically forced further under the tire in order to achieve the desirable engagement with a majority of the treads. The arcuate leading edge 34 enables the chock 10 to be placed in the operating position wherein the curvature of the edge 34 engages a majority of the treads along the contour of the tire without the need to physically force the chock 10 further under the wheel W. In this regard, the illustrated leading edge 34 defines a midsection 34a that is recessed relative to the sidewalls 18,20 as shown in FIGS. 4 and 5. The illustrated leading edge 34 preferably presents a low profile so that the tire of the wheel W engages the edge 34 and also engages one or more of the raised wheel-engaging ribs 24a at the same time as shown in FIG. 6. Similar to the back wall 22 previously detailed, the illustrated leading edge 34 also includes an enlarged ground-engaging rim 34b to provide strength to the body 12.

As previously indicated, the illustrated wheel-supporting surface 24 is a non-solid surface. In more detail, and as shown in FIGS. 1–2, 4–5, and 7, the illustrated body 12 includes a pair of anti-skid support legs 36 and 38 that extend from the surface 24 to the ground. The legs 36,38 extend through the internal chamber 14 and project into the open face 16 so as to engage the ground when the chock 10 is in the operating position. For purposes that will subsequently be described, each of the legs 36,38 are hollow or open in the center so that the open centers are in communication with the surface 24. Additionally, these open centers are larger at the surface 24 and taper from the surface 24 to the bottom (see FIG. 7). Each of the legs 36,38 are configured to facilitate anti-skidding of the chock 10 and in this regard each leg 36,38 includes a ridged ground-engaging section 36a and 38a, respectively. Similar to the previously described barbs 18b,20b, the ridges of the sections 36a,38a angle away from the leading edge 34 to enable the chock 10 to be easily slid in a forward direction towards the wheel W (e.g., right-to-left as viewed in FIG. 6), but is generally prevented from sliding in a backward direction away from the wheel W (e.g., left-to-right as viewed in FIG. 6). Each of the legs 36,38 includes an anchoring aperture 36b and 38b, respectively, formed through the corresponding ground-engaging section 36a,38a (see FIGS. 4 and 5). The apertures 36b,38b, like the previously described aperture 32, are configured to receive some type of anchor (e.g., a stake, bolt, nail, etc.) if the user desires to further secure the wheel chock 10 to the ground in a more permanent configuration. Additionally, the apertures 36b,38b enable water and other debris to drain out of the legs 36,38, for example, during cleaning of the chock 10. For purposes that will subsequently be described, and to a lesser extent to provide structural strength to the body 12, the legs 36,38 are joined beneath the surface 24 by a transverse spacing gusset 40 (see FIGS. 5 and 7). In a similar manner, the back leg 38 is joined to the back wall 22 by a spacing gusset 42.

As indicated above, the body 12 includes several structural features that facilitate strengthening the construction of the chock 10, including the raised wheel-engaging ribs 24a, the embossed rims 18a,20a,22a,34b, the legs 36,38, and the gussets 40,42. These structural features cooperate to provide the wheel chock 10 a strong and durable uni-body construction without requiring excess material thickness. This construction enables the wheel chock 10 to be formed from relatively light-weight materials that can be cost-effectively mass produced without compromising the strength and durability of the chock. For example, the illustrated wheel chock 10 is formed from injected molded plastic, preferably polypropylene or polyethylene with the walls having a thickness as thin as about one-hundred and twenty thousandths of an inch. In this manner, the illustrated wheel chock 10 is readily transportable and easy to store. While this uni-body, molded plastic construction is preferred, it is within the ambit of the present invention to form the wheel chock from virtually any material(s), including materials other than plastic, and in virtually any manner, including constructions other than the illustrated uni-body configuration.

In addition to enabling the durable uni-body construction detailed above, the unique structural features also cooperate to enable the internal chamber 14 in communication with the open face 16 while maintaining the structural integrity of the body 12. As shown in FIG. 5, the illustrated internal chamber 14 is defined between the walls 18,20,22 and the surface 24 in and around the legs 36,38. The internal chamber 14 communicates with the open face 16 as shown in FIG. 7. The open face 16 is defined by the rims 18a,20a,22a,34b and is closed by the ground when the wheel chock 10 is placed in the operating position. The angled sidewalls 18,20 and tilted back wall 22 cooperate to enable the open face 16 to define a horizontal cross-sectional area that is greater than the surface area defined by the wheel-supporting surface 24. In a similar manner, the tapered configuration of the hollow centers of the support legs 36,38 enable the open faces of the legs 36,38 presented along the surface 24 to define a greater area than the area of the corresponding ground-engaging sections 36a,38b. In this manner, the body 12 of the chock 10 can stackably nest within another similarly configured wheel chock. For example, as shown in FIG. 7, the illustrated wheel chock 10 is nestably received through the open face and into the internal chamber of a similarly configured wheel chock 44. The nestability of the wheel chocks 10,44 enable a compact, space-efficient storage of the chocks 10,44 that facilitates ready portability for transportation of a pair or more of the chocks 10,44. It will be appreciated that once nested together, similarly configured components tend to adhere to one another, or "stick" together, particularly when formed from plastic and even more so if slightly damp. Accordingly, the spacing ribs 26,28 and spacing gussets 40,42 on the illustrated body 12 space the nested wheel chock 10 from the corresponding surfaces of the wheel chock 44 to thereby prevent adhesion therebetween and thus facilitate a quick and easy removal of the chock 10 from the chock 44.

It is within the ambit of the present invention to utilize various alternative configurations for the wheel chock 10. For example, while the arcuate leading edge is important for some aspects of the invention, it is not necessary for constructions in accordance with the other aspects of the invention. Similarly, nestability is only important for some aspects of the invention and therefore the other aspects of the invention could utilize a configuration not presenting an internal chamber communicating with an open face. Even where nestability is important, the open face could be alternatively configured on a side other than the preferable bottom of the chock.

In operation, the wheel chock 10 is placed under the wheel W so that the leading edge 34 is generally transverse to the wheel W as shown in FIG. 4. The chock 10 is then slid under the wheel W into the operational engagement position wherein the leading edge 34 first engages the rubber tire of the wheel W as shown in FIG. 6. In this position, the arcuate leading edge 34 engages the majority of the circumferentially extending treads along the tire of the wheel W and the tire also engages at least one of the raised tire-engaging ribs 24a along the wheel-supporting surface 24. It will be appreciated that the unique body 12 of the wheel chock 10 can be positioned in this operating position without the need for the user to kick the chock into place. However, if desired, the user can physically force the chock 10 further under the wheel W until the tire engages more of the ribs 24a, such as by kicking the chock. If desired, the wheel chock 10 can be anchored to the ground by placing some type of cleat through one or more of the apertures 32,36b,38b for a more permanent application. If desired, a second chock, such as the chock 44, can be placed in a similar position on the other side of the wheel, or one or more additional chocks can be placed in similar positions under one or more wheels of the vehicle.

Once in position, the wheel chock 10 substantially prevents the wheel W from undesired movement toward the chock 10. It will be appreciated, that in extreme applications (e.g., very heavy vehicles on steeply sloped ground, etc.), the wheel W may move in the direction of the chock 10 to some degree. However, the wheel W will engage the ribs 24a along the arcuate supporting surface 24 causing the wheel W to stop further movement in this direction. The anti-skid ribbing 18b,20b and anti-skid leg sections 36a,38a prevent the chock 10 from skidding along the ground under these loaded conditions. The strong, uni-body construction of the chock 10 cooperates with the form fitting complemental engaging relationship between the wheel W and the chock 10 to generally prevent the chock 10 from kicking out from under the wheel W or catastrophically failing. When the user is done using the wheel chock 10, the user simply grips the handle 30 and pulls the wheel chock 10 from under the wheel W. The wheel chock 10 can then be nested in one or more similar chocks, such as the chock 44, for efficient stowing away in the vehicle for easy transportation without the threat of the chocks becoming unpaired or one of them lost. Alternatively, the chock 10 could be hung on a hanger through the hanging aperture 32. If nested, the chocks 10,44 are readily separable for the next use as the spacing ribs and gussets 26,28,40,42 prevent the chocks 10,44 from "sticking" together.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A pair of nestable wheel chocks for preventing rotation of a wheel, each of said chocks comprising:
   a body adapted to be placed under the wheel to generally prevent the wheel from rotating in the direction of the body,
   said body including a pair of spaced sidewalls, a back wall extending between the sidewalls, and a wheel-supporting surface extending between the side and back walls,
   said wheel-supporting surface defining a surface area,
   said body defining an interior chamber between said walls and surface and an open face communicating with said chamber,
   said open face defining a face area, said face area being greater than said surface area so that the wheel-supporting surface of one of the chocks can be received through the open face and at least partially within the interior chamber of the other chock, said open face having a perimeter, said body further including at least one supporting leg extending through the internal chamber between said wheel-supporting surface and said open face to present a ground-engaging section spaced within the perimeters, said supporting leg presenting a hollow center projecting from the wheel-supporting surface such that, when one of the chocks is received through the open face of the other chock, the ground-engaging section of the other chock is received in the hollow center of the one of the chocks.

2. The chocks as claimed in claim 1, said back wall presenting a generally trapezoidal shape.

3. The chocks as claimed 1, said body further including an embossed rim defining said open face, at least a portion of said rim including a plurality of barbs angling away from said wheel-supporting surface.

4. The chocks as claimed in claim 1, said supporting leg tapering from said wheel-supporting surface to said ground-engaging section.

5. The chocks as claimed in claim 4, said ground-engaging section including a plurality of ridges angling away from said wheel-supporting surface.

6. The chocks as claimed in claim 1, said body further including at least one gusset extending from said supporting leg and being fixed relative to said back wall.

7. The chocks as claimed in claim 6, said gusset extending away from the underside of said wheel-supporting surface so as to prevent the other chock from engaging the underside of the wheel-supporting surface when the other chock is received through the open face and at least partially within the interior chamber.

8. The chocks as claimed in claim 1, said wheel-supporting surface including a leading edge adapted to engage a portion of the wheel when the body is placed thereunder, said leading edge being oppositely spaced from said rear wall and extending between said sidewalls.

9. The chocks as claimed in claim 8, said leading edge being arcuate so as to define a midsection that is recessed relative to the sidewalls.

10. The chocks as claimed in claim 1, said back wall including a handle integrally formed therein.

11. The chocks as claimed in claim 1, said perimeter being defined by a ground-engaging rim of at least one of the walls, said ground-engaging section being separate from the rim.

12. The chocks as claimed in claim 1, said chocks being substantially identical in shape and dimension.

13. The chocks as claimed in claim 1, said leg presenting an open leg face along the wheel-supporting surface, said open leg face presenting an area that is greater than that of the ground-engaging section.

* * * * *